Patented July 7, 1925.

1,545,319

UNITED STATES PATENT OFFICE.

JOHN C. HEBDEN, OF NEW YORK, N. Y., ASSIGNOR TO HEBDEN SUGAR PROCESS CORPORATION, OF NEW YORK, N. Y., A CORPORATION OF NEW YORK.

SUGAR PURIFICATION.

No Drawing.    Application filed November 1, 1921.    Serial No. 512,074.

*To all whom it may concern:*

Be it known that I, JOHN C. HEBDEN, a citizen of the United States, residing at New York city, in the county of New York and State of New York, have invented new and useful Improvements in Sugar Purification, of which the following is a specification.

The present invention relates to the purification of sugar juices and particularly cane sugar juices, and the primary object of the invention is to provide a novel and improved process whereby cane sugar of greater purity, either raw or white, is obtainable directly from cane juice, and the cane sugar thus produced from raw juice contains a greater percentage of crystallizable white sugar than has been previously found possible. The improved process may be carried out with the aid of the plant equipment heretofore used generally in carrying out the regular raw sugar process and it follows, in a general way, such process, although the improved process eliminates some of the steps or treatments previously found necessary and which were expensive and otherwise objectionable, and it effects other economies in commercial practice.

At present, nearly the total tonnage of cane sugar is manufactured in two steps, the cane being first treated to extract the juice and the resultant juice treated to produce a raw sugar having a content of approximately 96% of crystallizable sugar; and the raw sugar so obtained is subsequently treated in refineries where it is further purified and recrystallized to obtain the white granulated sugar of commerce which is approximately 100% pure. By such process the sugar is subjected to two crystallizations.

Processes have been proposed for the purpose of enabling white sugar to be produced direct from the cane, thus avoiding the expense of a double treatment and crystallization. These processes may be mainly classed as either sulfitation processes, using sulfurous acid as the bleaching and precipitating agent, or carbonatation processes, using carbonic acid as the clarifying and precipitating agent, but these processes and such others as have been heretofore proposed, depend upon the formation of precipitates in the juice to collect and carry down the impurities. Such processes may be termed co-precipitation processes because the impurities are precipitated as the result of the formation of insoluble compounds in the juice, which compounds collect and gather the insoluble bodies contained therein and thus remove them from the juice. The co-precipitation processes however require great care and attention to the details of the various steps thereof, and they are relatively slow and hence they impede the operation of the mill. Such processes depend on the formation of precipitates from soluble compounds added to the juice. The formation of the precipitates or insoluble compounds is retarded and sometimes almost prevented or is prevented from going to completion by the marked inhibiting action of the juice on the chemical reactions involved, and furthermore, some of the soluble substances added to the juice remain therein in new combinations. Moreover, the co-precipitation processes require the installation of a large amount of equipment and this adds to the expense of such processes.

In the regular processes for the manufacture of raw sugar and also in the co-precipitation methods, as already stated, soluble substances or re-agents are added to the juice and either remain in the juice or syrup in new combinations or are removed as much as possible as precipitates intentionally formed. The action of heat on many of the impurities of the juice, particularly on the protein or albuminous bodies, is largely depended upon for purification. There are thus soluble compounds formed and added to the juice or syrup from two sources: first, from the action of lime on the acids normally in the juice; second, from the decomposing action of lime and lime salts on the sugars and other bodies by the action of heat.

The composition of the juices flowing from the mill varies hourly. The re-agents used do not have a specific reaction on the various impurities normally in the juice, but react with nearly all of the compounds derived from the cane. Thus lime not only neutralizes acids, but it combines with tannins, polyphenols, proteins and albuminous bodies as well as with the sugars themselves. With the tannins and polyphenols it forms compounds which are easily oxidized to dark colored products. The syrup, therefore, made from limed juices is always much darker than the concentration of the juice would predict. The increase in color varies from two to four times the depth of color due to the concentration. The lime also reacts with the sugars forming compounds which are easily decomposed, producing bitter tasting bodies and caramel-like products. Many of these compounds are taken up by the raw sugar in graining, but the bulk of these impurities is found in the final molasses.

While sulfurous acid has a bleaching action on cane juices, we believe any other acid, as for instance phosphoric, in an equivalent concentration, would reduce the color to practically the same shade. The coloring matters being phenolic in character, react as indicators and are sensitive to both acids and alkalis. While the precipitate of calcium sulfite carries down impurities and heating in the sulfitation process aids in the removal of protein and albuminous and similar compounds, the high acidity used in this process must have an inverting action and thus cause a loss of sugar. The same criticism may be used against the use of carbonic acid. The optimum temperature and the optimum per cent acidity or alkalinity must be regulated carefully; otherwise, destruction of sugar will occur or the whole process fail. As none of the re-agents used in the manufacture of raw sugar or in the manufacture of white sugar from raw juice are specific in their reactions a most careful control of temperature, lime and acidity is necessary.

The present invention provides a process whereby superior results are attained as compared with the regular or co-precipitation raw sugar processes and raw or white cane sugar is obtained direct from the cane juice without the objections inherent in the regular lime and in the co-precipitation processes. It is based on the discovery that the organic acids found in cane sugar juice and which form or constitute a large part of the impurities therein, may be classified as those stronger than carbonic acid and those weaker than carbonic acid, and it comprehends the neutralization of these acids by re-agents which react specifically with these respective acids and do not react on the sugar and on the other constituents of the juice, and which re-agents are preferably insoluble in the juice and hence no soluble compounds are added to the juice which would require further treatment for their removal. The impurities which react with these insoluble re-agents are removed, and the inhibiting action of the juice or cane sugar solution is thereby overcome. While the degree of acidity of the juice as it comes from the mill, as already noted, varies from hour-to-hour as the cane is crushed, due to varying conditions of the cane used, yet the reactions of the re-agents are specific to the respective impurities which it is intended they should remove, and these reactions are definite, automatic and limited.

In carrying out the process according to the present invention, the procedure is preferably as follows: The sugar cane is crushed or ground, for example, in the usual mill and the juice may be weighed, as is done in the regular raw sugar process. Instead of liming the juice however, as is customary in the regular raw sugar process, the juice is, in the preferred treatment, submitted to what I term a first neutralizing operation, the purpose of which is to neutralize those acids in the juice which are stronger than carbonic acid, such as acetic, lactic and similar acids normally in the cane or produced by the decomposition of cane products. This operation may consist in treating the juice with the salt of an acid weaker than carbonic acid or with a carbonate, but I prefer to use a carbonate which is insoluble in the juice, as for example, calcium carbonate or other water insoluble carbonate, or with any water soluble or water insoluble soap or similar compound, or with trisodium phosphate or a similar compound, a sufficient quantity thereof being used to neutralize those acids contained in the juice which are stronger than carbonic acid. By this treatment, the re-agent used reacts specifically on those acids which are stronger than carbonic acid but does not react on the sugars or on other constituents of the juice. The acids stronger than carbonic acid obviously may be neutralized by the salts of acids weaker than carbonic acid, or with water soluble carbonate or other water soluble compounds, but when these water soluble compounds are used an excess of the re-agent must be avoided. The solution must therefore be tested to determine the quantity of soluble re-agent to be used. When a water insoluble carbonate or other water insoluble re-agent is used for neutralizing the acid stronger than carbonic acid, an excess of the re-agent may be used without reacting upon any other substances contained in the juice except those acids which are to be neutralized, namely, the acids stronger than carbonic acid.

The next step of the process consists in neutralizing those acids in the juice which are weaker than carbonic acid and similar substances such as the polyphenols, tannin bodies, glucosides and amido acids, and some amphoteric bodies which react either as acids or bases. This neutralizing treatment, which, if desired, can be performed in the same tank in which the first neutralizing operation was previously performed, is effected preferably by submitting the juice which is now slightly acid in reaction, to the action of certain water insoluble re-agents which will react specifically on these relatively weaker acids in the juice and which re-agents preferably are carried by a water insoluble substrate upon which the precipitates resulting from the reaction by which they are produced collect, thus enabling these precipitated substances to be easily separated from the juice. Preferably, bagasse is employed as a substrate in view not only of its availability, insolubility in water and other properties, but because of the facility with which it may be filtered or otherwise separated from the juice and the economic advantages which it offers with respect to its ultimate disposal. The substrate is preferably prepared by precipitating on a suitable quantity of finely ground bagasse suspended in water, the water insoluble re-agent or activated substance of a character and in amount sufficient to neutralize the relatively weaker acids in the juice to the neutral point using litmus as an indicator, an excess of such activated substance doing no harm however, owing to its specific reaction with the acids which it is intended it should neutralize, its in water insolubility and its easy removal from the juice.

I have found that any of the re-agents comprehended by my prior application Serial Number 466,493, filed May 3, 1921, for the absorption or removal of coloring matters and the major part of the gums from cane juices and similar sugar solutions may be used to neutralize these acids weaker than carbonic acids, as well as to remove coloring matters and the gums, as I had previously discovered could be done. These substances may be defined as dye-mordants or lake-forming compounds.

Any one of the water insoluble compounds having the properties of acting as a mordant in dyeing may be used advantageously as a re-agent for this purpose. For example, the hydroxides of any of the metals which form water insoluble compounds with tannic acid can be used, although the hydroxides of iron, aluminum and titanium are preferable, as they are non-poisonous and have been found serviceable, they being capable of acting as mordants which will fix mordant dyeing or acid dyestuffs. However, the water insoluble tannates and ferro-cyanides and the insoluble ferri-cyanides, as well as the water insoluble sulfo-cyanides can be used, they being capable of acting as mordants which will fix basic dyestuffs, and it being known that the water insoluble tannates are capable of combining with both basic and acid dyestuffs. Or, a synthetic animal fibre or a synthetic substance having the same affinity or capacity of absorbing basic dyestuffs as does wool, leather protein and similar substances, may be used, such, for example, as a water insoluble compound or precipitate of a gelatine or similar nitrogenous substance which can be rendered insoluble in water and thus precipitated by various inorganic compounds, such as salts of chromium, iron, aluminum or by organic compounds such as tannic acid or those bodies which are classed under the general term "tannin" or formaldehyde and similar substances, as well as the synthetic or manufactured products which can be used for tanning hides to produce leather, as for example, sulphonic acids of the aromatic hydrocarbons or their substituted compounds, or the condensation products derived from these either with or without the use of formaldehyde or similar condensing agents. Also, the products derived from the sulfite waste liquors of the sulfite wood pulp manufacturing industry commercially known as lignone, sulfite waste and similar denominations may be used as precipitating re-agents to produce the water insoluble glue, gelatine or protein compounds which are capable of fixing basic dye-stuffs and of absorbing and thus removing gums and albuminous substances. These re-agents may be prepared substantially as described fully in my prior application, above identified, with the exception that instead of using the substrates mentioned in said application, bagasse is used for this purpose, finely-divided bagasse being suspended in water and then treated with the re-agents, the latter producing a water insoluble compound on the bagasse. Obviously, any one of these re-agents can be used alone or a mixture of two or more of them may be used.

The cane juice containing the salts of the acids stronger than carbonic acid as the result of the previous or first neutralizing treatment, and which is slightly acid in reaction, due to the presence therein of the acids weaker than carbonic acid, may be treated with the substrate having the re-agent incorporated therewith by passing the juice into suitable tanks which may be the defecating tanks such as those usually employed in using the regular raw sugar process, and which should be provided with an efficient stirring device which may be either mechanical or compressed air or any suitable kind. A suitable amount of the substrate is added to the juice and the latter then preferably heated to the boiling point as in the regular raw sugar process to complete the reaction. At 98° C. a very definite reaction begins, the color of the suspended substrate which is nearly white or greyish, quickly turning blackish; and the juice shows a separation of suspended matter and becomes clear and brilliant with the separated solids suspended therein. This substrate treatment neutralizes those acids in the juice which are weaker than carbonic acid, converting them into water insoluble compounds or solids, the juice being uniformly and positively neutralized to the neutral point, as indicated, using litmus as an indicator.

The neutralized juice with the separated impurities suspended therein is next filtered to remove the bagasse, mud and the separated and suspended matters including coloring matters removed by the substrate, and it is to be understood that any of the usual or known filter operations may be used. The ordinary filter press method commonly used in the regular raw sugar process may be used advantageously and the filtration may be performed with great speed and facility. Owing to the volume and the porous or spongy nature of the bagasse and the fact that the re-agent which it carries dilutes the muds or absorbs the impurities which ordinarily impede filtration, the total amount of the juice can be filtered to a brilliant product as easily or more easily than the lime-defecated juice is clarified and the muds obtained in clarification filtered in the regular raw sugar method.

The filter cake obtained in carrying out the filtering operation by the filter press method or by any other method which produces a filter cake, as above described, may be washed in a centrifugal or otherwise to obtain a cake practically free from sucrose, or it may be fed on to the mill and macerated in the regular way with the bagasse, so as to minimize or prevent loss of sucrose, and the residue of the cake may then be sent to the furnace for use as fuel, for which purpose it is suitable, owing to its low clinker or ash forming content, thus not only avoiding the difficulties and expense heretofore involved in the disposal of the muds as filter cake obtained in the regular raw sugar process, but effecting a substantial economy in fuel expense.

The brilliant juice, after filtration, is evaporated to syrup and this may be done by any suitable method, preferably by substantially the method usually followed in the regular raw sugar process. Because of the absence of lime salts or calcium compounds or suspended matter in the juice, fouling of the evaporator is avoided, and the resulting syrup is of greater purity than that obtained by the regular raw sugar process.

The syrup is next submitted to the graining operation which preferably is performed substantially in accordance with the usual practice in the regular raw sugar process. Owing to the freedom of the syrup from suspended matter, the more complete removal of impurities and the absence of lime salts in any quantity, the graining of the sugar from such syrup proceeds very smoothly and the crystal grows regularly as the syrup is fed, due to the fact that the syrup is of a regular composition, or in other words, does not contain a varying amount or character of impurities as does the syrup produced in the regular raw sugar process.

The crystallized sugar may then be purged, cured and dried and these operations may be performed in substantial accordance with these operations as usually performed in the regular raw sugar process, and it will be found that the crystal, which is white, owing to the absence of insoluble impurities in the syrup to contaminate the sugar as it crystallizes, is easily purged, cured and dried, because of the low viscosity of the accompanying molasses, and moreover, white sugar of 100% purity can be obtained by exercising reasonable care.

If desired, the cold raw cane juice, either prior or subsequent to the first neutralizing operation thereon, may be treated in a solid basket centrifugal to remove a percentage of cane fibre substance, clay, mud and insoluble compounds and particularly those portions of the cane wax and similar bodies which are not brought into solution by the grinding; and also, if it is desired to make the juice and syrup water-white it may be treated when filtered or otherwise with bone-char, a vegetable char or a similar carbon, in which case an absolutely white syrup will result. However, the syrup obtained by the present invention without the char or carbon treatment, although slightly colored, yields a white sugar because all the coloring matters and substances not sugar are soluble. It is obvious that any hardness in the juice or any lime, calcium, magnesium or similar compounds in the juice or introduced into the juice by the water used in maceration may be removed by adding before filtration a suitable phosphoric acid compound or any other compound which can be used for removing hardness from water.

The process provided by the present invention possesses the practical advantages that it enables white sugar of superior quality to be obtained direct from sugar cane juice by a series of treatments which correspond in a general way to the regular raw sugar process but avoid difficulties heretofore experienced in practicing the regular raw sugar process, the present process avoiding particularly the great care required in carrying out the regular raw sugar process, owing to the fact that the juices are automatically rendered neutral to litmus by the neutralizing re-agents and they remain so throughout the process, and hence the inverting action of these acids is overcome, the neutralizing re-agents used are insoluble in the sugar juice and hence no soluble compounds are added to the juice except the salts of the acids which are stronger than carbonic acid, the re-agents react specifically on the respective organic acids in the juice and do not react on the other constituents thereof, the process enables the juices to be handled as rapidly as does the regular raw sugar process and hence may be used on plantations equipped to practice the regular raw sugar process without hindering or delaying the harvesting of the crop, and moreover, it may utilize substantially the same plant equipment ordinarily used in carrying out the regular sugar process.

What is claimed is:—

1. The herein described improvement in the art of purifying sugar juices which comprises neutralizing acids contained in such juices by treating such juices with neutralizing reagents which are substantially insoluble in water, one of said reagents being capable of reacting with those acids which are stronger than carbonic acid and another of said reagents being capable of reacting with those acids which are weaker than carbonic acid.

2. The herein described improvement in the purification of sugar juice which comprises neutralizing those acids contained therein which are stronger than carbonic acid and those which are weaker than carbonic acid by treating the juice with neutralizing reagents which are substantially insoluble in water and cannot combine with the sugar substances in the juice, one of said reagents being capable of reacting with those acids which are stronger than carbonic acid and another of said reagents being capable of reacting with those acids which are weaker than carbonic acid.

3. The herein described improvement in the purification of sugar juice which comprises adding thereto a substantially water-insoluble basic compound capable of reacting with those acids contained in the juice which are stronger than carbonic acid and a basic compound capable of reacting with those acids in the juice which are weaker than carbonic acid.

4. The herein described improvement in the purification of sugar juice which comprises treating the juice with a carbonate which is substantially insoluble therein to neutralize those acids contained in the juice which are stronger than carbonic acid and subsequently submitting the juice so treated to the action of another re-agent which is capable of neutralizing those acids in the juice which are weaker than carbonic acid.

5. The herein described improvement in the purification of sugar juice which comprises neutralizing those acids contained in the juice which are stronger than carbonic acid and subsequently adding a substrate carrying a base which is insoluble in water and is capable of reacting with those acids in the juice which are weaker than carbonic acid.

6. The herein described improvement in the purification of sugar juice which comprises concurrently neutralizing some of the acids and removing coloring matters contained therein by adding to the juice a water-insoluble compound which will react with acids stronger than carbonic acid and a basic compound insoluble in water and comprising a base which will react with acids weaker than carbonic acid and is capable of combining with coloring matters contained in the juice.

7. The herein described improvement in the purification of sugar juice which comprises treating the juice with a dye-mordant which is insoluble in the juice and capable of fixing basic and acid dyes to neutralize those acids contained in the juice which are weaker than carbonic acid.

8. The herein described improvement in the purification of sugar juice which comprises treating the juice with a carbonate which is insoluble in water to neutralize those acids contained in the juice which are stronger than carbonic acid and subsequently treating the juice with a dye-mordant which is capable of fixing basic and acid dyes to neutralize those acids in the juice which are weaker than carbonic acid.

9. The herein described improvement in the purification of sugar juice which comprises treating the juice with a substrate carrying a dye-mordant which is insoluble in water and capable of fixing basic and acid dyes to neutralize some of the acids contained in the juice.

10. The herein described improvement in the purification of sugar juice which comprises treating the juice with dye-mordants which are capable of fixing basic and acid dyes and of reacting with acids contained in the juice to neutralize them, one of said dye-mordants being also capable of removing gums and albuminous substances contained in the juice.

In testimony whereof I have hereunto set my hand in presence of two subscribing witnesses.

JOHN C. HEBDEN.

Witnesses:
HENRY NAY,
N. C. BRITTIN.